United States Patent [19]

Tippetts

[11] 4,019,697
[45] Apr. 26, 1977

[54] FLUIDIC APPROACH POWER COMPENSATOR CONTROL SYSTEM

[75] Inventor: Thomas B. Tippetts, Scottsdale, Ariz.

[73] Assignee: The Garrett Corporation, Los Angeles, Calif.

[22] Filed: Aug. 25, 1975

[21] Appl. No.: 607,530

[52] U.S. Cl. .............................. 244/78; 137/805; 137/819; 235/200 PF

[51] Int. Cl.² ....................................... B64D 37/00

[58] Field of Search ............... 244/78, 77 D, 77 S, 244/182; 137/805, 819, 820, 821, 835, 836; 60/39.28 R; 235/200 PF, 201 PF

[56] References Cited

UNITED STATES PATENTS

| | | | |
|---|---|---|---|
| 3,592,383 | 7/1971 | Ringwall | 244/78 |
| 3,627,237 | 12/1971 | Smith | 244/77 D |
| 3,633,603 | 1/1972 | Furlong et al. | 137/805 |
| 3,780,769 | 12/1973 | Posingies | 137/819 |

Primary Examiner—Trygve M. Blix
Assistant Examiner—Barry L. Kelmachter

Attorney, Agent, or Firm—James W. McFarland; Albert J. Miller

[57] ABSTRACT

A fluidic control system which automatically schedules and controls power developed by an aircraft during landing approach operation. Fluidic signals are generated in relation to sensed aircraft flight parameters, and these signals are combined in a preselected manner which includes integration of one of the signals by a series feedback capacitance fluidic integrator, to produce a single input signal indicative of a desired rate of fuel flow to schedule aircraft power to the desired level. The single input signal is temperature compensated, then discretely selectively modified in relation to ambient conditions by selectively varying the impedance of fluidic resistive networks to alter the gain of a fluidic amplifier driven by the single input signal. An error signal is then generated and amplified to produce a power output signal which drives a fuel control servo actuator in proportion to the error signal when the latter is small, and drives the servo in a digital manner when the error is large.

44 Claims, 12 Drawing Figures

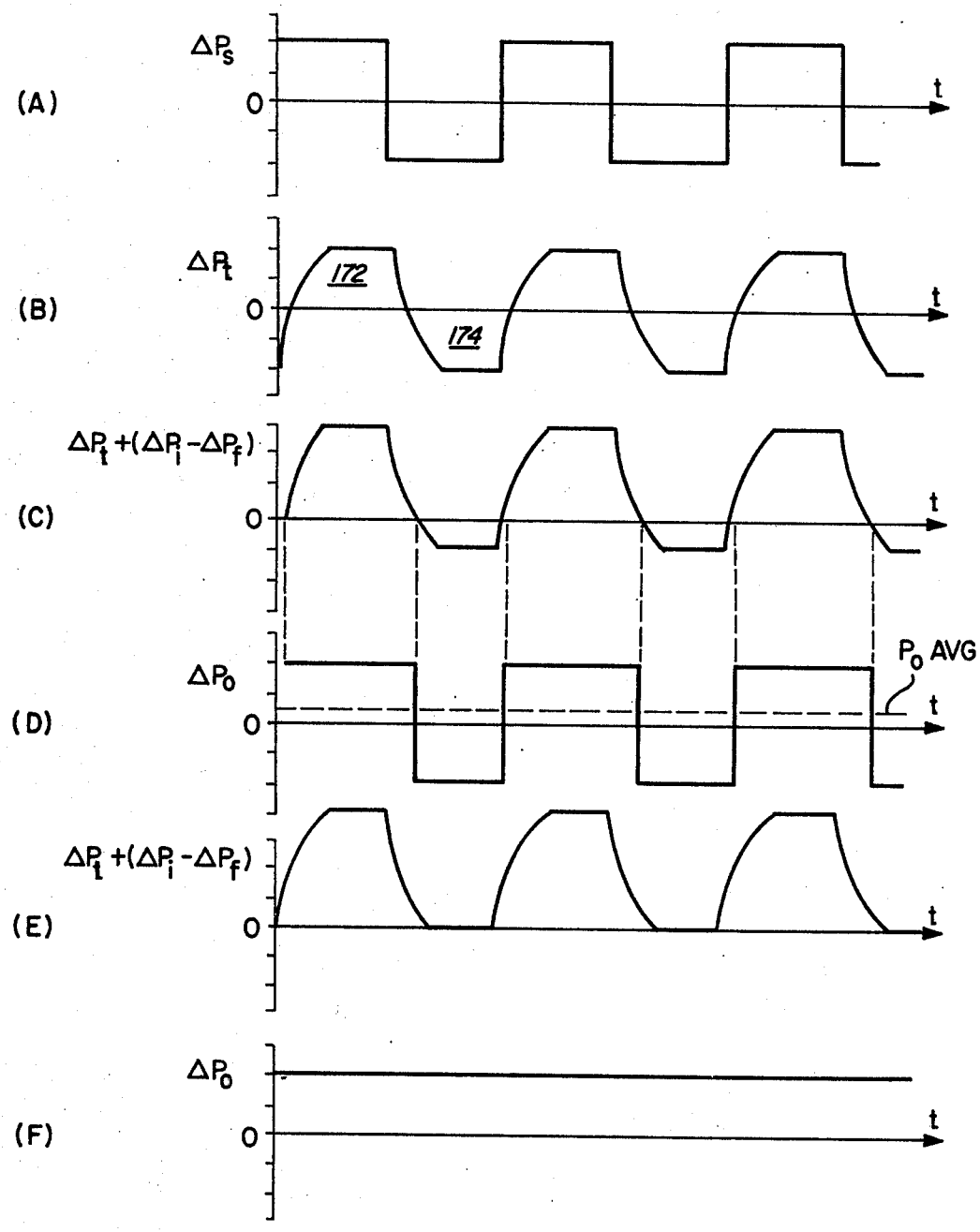

FLUIDIC APPROACH POWER COMPENSATOR CONTROL SYSTEM

BACKGROUND OF THE INVENTION

The invention herein described was made in the course of or under a contract with the Department of the Navy.

This invention relates to fluidic control systems, and relates more particularly to control systems for controlling aircraft power during landing approach operation thereof, and to improved fluidic devices useful in such systems.

Approach power compensators are automatic throttle control systems that are used during aircraft landing phase to maintain constant air speed. Constant air speed is obtained by holding the angle of attach of the aircraft constant by modulating engine thrust through control of the fuel flow to the engine. Prior art approach power compensators are electromechanical in nature.

SUMMARY OF THE INVENTION

The present invention contemplates a fluidic control system as an approach power compensator having improved reliability, lower cost, and simpler installation in comparison to prior art electromechanical systems. In particular, the invention contemplates a fluidic approach power compensator control which may be installed as a single package. Because the fluidic system can withstand extreme temperature environments such as that encountered in the location of the fuel control to the aircraft engine, the fluidic system has substantial advantage over prior art electromechanical systems wherein the electronic computer must be installed at a remote location from the adverse environment encountered at the fuel control actuator.

The invention contemplates a control system wherein aircraft angle of attach, acceleration normal to the direction of aircraft flight, and elevator position are sensed and corresponding fluidic signals generated. The angle of attach fluidic signal is fluidically integrated, and the three signals are then modified in magnitude relative to one another to allow direct combination of the three signals to produce a single signal according to a preselected formula which is indicative of the desired rate of fuel flow to the aircraft engine to schedule engine power to the required level. The magnitude of the single input signal is altered in relation to ambient environmental conditions and then compared with a fluidic negative feedback signal that is indicative of the actual fuel flow being delivered to the engine. The resulting error signal is then amplified to drive a fluid responsive actuator to correct the fuel flow to the desired level.

Amplification of the error signal is accomplished through an improved fluidic amplifier which generates a power output signal having dual mode characteristics. When the error signal is relatively small, the output signal is of a magnitude proportional to that of the error signal. But when the error signal is large and thus substantial correction to fuel flow is required, the output signal is digital in nature generating greater power for faster correction of fuel flow.

An improved integrator is provided for the angle of attack fluidic signal which includes pneumatic capacitors directly installed in series relationship in negative feedback loops around a high gain amplifier, the opposite sides of the capacitors being directly connected with input and output ports of the fluidic high gain amplifier. This particular integrator arrangement provides an output signal that is not only the integrated value of the input signal, but also produces a gain in the output signal. This combination of integral-plus-proportional control simplifies the fluidic circuitry required to produce a single signal that is indicative of the desired rate of fuel flow.

The circuit includes an improved gain selector which allows the pilot to selectively modify the circuit gain in relation to ambient conditions. By use of a tristable fluidic amplifier which selectively alters the impedance of resistive networks associated with the input ports of a fluidic amplifier, the gain across the amplifier is selectively modified for cold-day, hot-day, and normal-day ambient conditions.

These and other objects and advantages of the present invention are particularly set forth in or will become apparent from the following detailed description of a preferred embodiment of the invention when read in conjunction with the accompanying drawings.

BRIEF DESCRIPTION OF THE DRAWINGS

In the drawings:

FIGS. 6a through 6f are a series of graphical representations of the time cyclical operation of the dual mode servo actuator as shown in FIG. 4.

DETAILED DESCRIPTION OF THE PREFERRED EMBODIMENTS

Referring now more particularly to the drawings, it is noted that the graphical fluidic symbols utilized in FIGS. 2–5 are in accordance with the Department of Defense Military Standard Fluerics Terminology and Symbols, MIL-STD-1306A dated 8 Dec. 1972, available from the Department of Defense, Washington, D.C. 20301.

Figure 1:
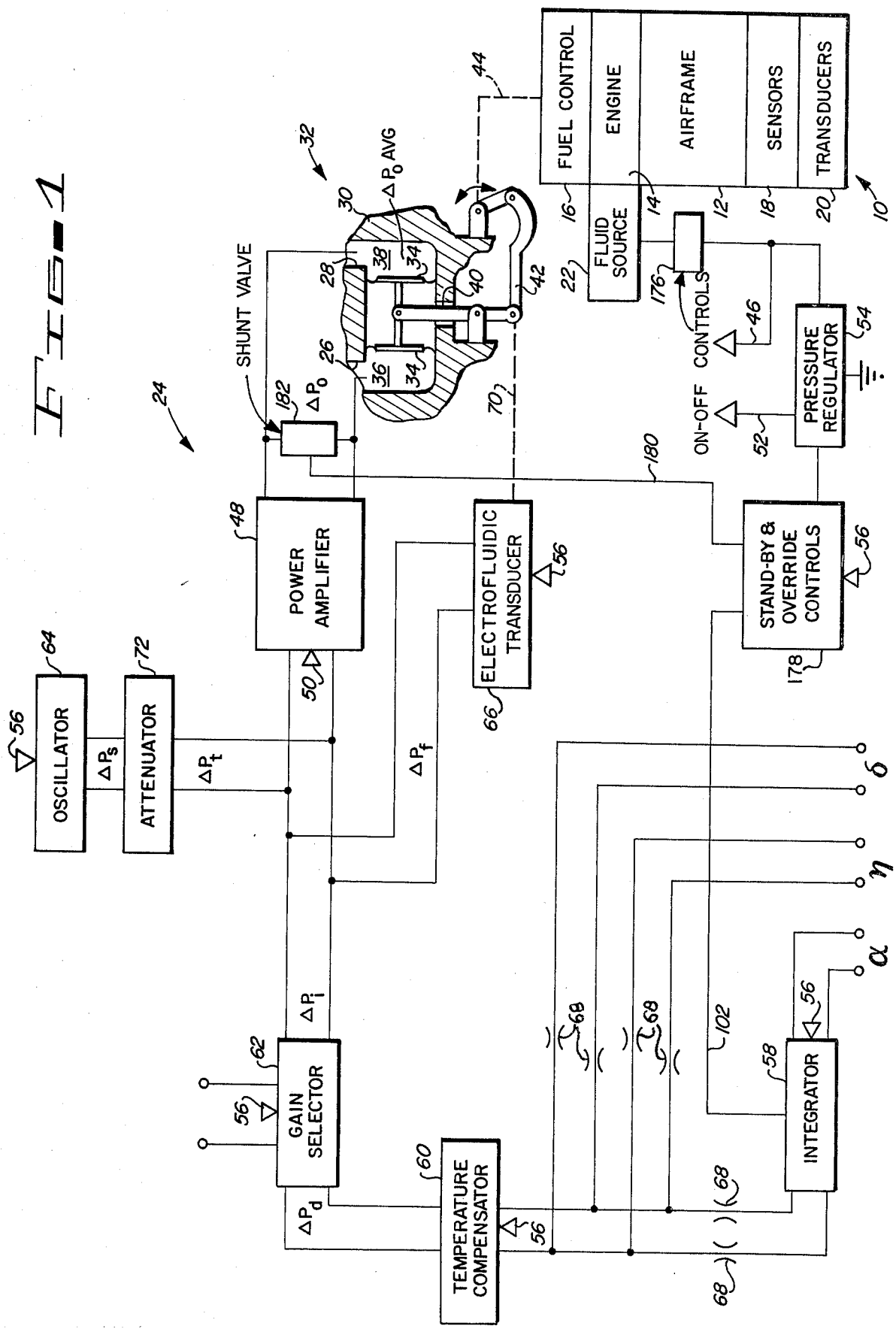
FIG. 1 is a schematic representation of a fluidic control system as contemplated by the present invention.

FIG. 1 illustrates in block diagram form an aircraft 10 comprising an airframe 12, appropriate thrust engines 14 such as a plurality of turbofan engines, a fuel control or delivery system 16 that is adjustable to control rate of fuel flow to the engine and thus power developed by the aircraft, sensors 18 which sense appropriate flight parameters of the aircraft, and transducers 20 which transform the sensed parameters into fluidic signal. The sensors conventionally may be electrical, mechanical or electromechanical with appropriate transducers 20, as necessary, to generate the indicative fluidic signals. The engine 14 is of the type which produces a substantial airflow and thus provides a fluid source 22 for supplying pressurized fluid flow to a fluidic control system generally designated by the numeral 24. It will be noted that the engine fuel control and fluid source are in an extremely high temperature environment and the gas fluid flow developed from source 22 is of a relatively high temperature.

Fluidic system 24 is operable to generate a desied oscillatory pressure differential output signal $\Delta P_o$ that is impressed upon a pair of input ports 26, 28 of a housing 30 of a fluid responsive servo actuator 32. Actuator 32 includes a pair of diaphragms or pistons 34 traversing an interval cavity of housing 30 to define a corresponding pair of variable volume fluid chambers 36, 38 communicating with the input ports 26, 28. Actuator 32 acts to tend to integrate the signal $\Delta P_o$ such that the pistons 34 and an associated lever 40 pivotally mounted thereto are driven in relation to the time average of the input signal, i.e., $\Delta P_o$AVG. Through appropriate linkage 42 and 44, the mechanical movement of the servo actuator acts to adjust the fuel control 16 and thus the fuel flow to the engine and power developed by the aircraft.

Preferably, the fluid source 22 delivers the highest pressure gas conveniently available from engine 14 to the fluidic control system 24. Through one conduit 46 the high pressure gas, e.g., several hundred p.s.i., is supplied at 50 to a power amplifier 48 so that a relatively high differential pressure signal $\Delta P_o$ may be generated to provide maximum power for operating the fuel control with a relatively small sized actuator 32. Also, through a parallel conduit 52 the source 22 supplies fluid to a pressure regulator 54 which provides a substantially lower, constant pressure fluid flow through conduit 52 as a regulated supply output for the various calculating and control function devices in control system 24. Through not shown in FIG. 1 for purposes of clarity, the regulated supply from conduit 52 is interconnected with fluid pressure inlet ports 56 of various fluidic devices in the system including an integrator 58, temperature compensator 60, gain selector 62, oscillator 64, and an electrofluidic transducer 66.

Appropriate on-off controls 176 are included to permit interruption of flow from source 22 to conduits 46 and 52 to interrupt operation of control system 24. Also included in a fluidic "stand-by" control 178 fed with fluid from regulated source 52. Through conduits 102 and 180, this contrl is connected with integrator 58 and a shunt valve 182 extending across the conduits carrying the $\Delta P_o$ signal. When in a selected stand-by condition, control 178 is operable to energize valve 182 to permit direct interconnection of chambers 36, 38. Fluid from source 22 may then be supplied to system 24 for purposes of "warm-up" of function checkout, but yet the system will be inoperative. In such conditions, control 178 also directs pressure flow to conduit 102 and integrator 58 to prevent integrator operation as discussed below with respect to FIG. 2. Control 178 may also incorporate all desired "override" controls which act, for instance upon sensing a system malfunction, to automatically place the control 178 and system 24 in the stand-by condition.

Preferably the aircraft flight parameters which are sensed and then transformed into fluidic pressure differential signals by transducers 20, include the angle of the aircraft, $\alpha$, aircraft acceleration normal to the direction of aircraft flight, $\eta$, and the position of the elevator of the aircraft, $\delta$. Angle of attach, $\alpha$, is fed to and integrated by fluidic integrator 58 which is described in greater detail below with respect to FIG. 2, and then the integrated $\alpha$ signal is fluidically, algebraically combined with the $\eta$ and $\delta$ signals by direct summing through interconnection of the respective pairs of conduits carrying these pressure differential fluidic signals. By virtue of integrator 58, along with six flow restrictors 68 associated with each of the pairs of conduits carrying the three fluidic signals which alter the magnitude of each of these signals relative to one another, there is provided a single signal which is indicative of a desired rate of fuel flow required by the aircraft engine in order to develop power in accordance with a preselected schedule. Restrictors 68 are normally of a different size to afford the appropriate relative modification of the magnitude of the parameter signals so that the resulting signal is normally a non-constant, time varying signal capable of automatically scheduling fuel control throughout the entire landing approach operation of the aircraft. An example of a preferred calculation accomplished by the combining of the integrated $\alpha$ signal with the remaining fluidic parameter signals $\eta$ and $\delta$, is given by the following equation in Laplace transform terms:

$$\Delta L = \frac{1}{1+\tau_2 S}\left[\frac{K_1 \tau_1}{1+\tau_1 S}\Delta\alpha + K_2\Delta\alpha - K_3\Delta\eta - K_4\Delta\delta\right]$$

where:
 $L$ = angle of rotation of lever 40 which is indicative of the required fuel flow to provide the desired aircraft power;
 $S$ = Laplace transform operator;
 $\alpha$ = angle of attack in degrees;
 $\eta$ = aircraft normal acceleration in g's;
 $\delta$ = elevator position in degrees; and
 $\tau_1, \tau_2, K_1, K_2, K_3,$ and $K_4$ are parameters of such magnitude as to impart the correct dynamic performance to the system when used in conjunction with a particular airframe/engine combination.

The single signal is then fed to a temperature compensator circuit 60 which normalizes the fluidic pressure differential signal relative to the temperature of the fluid gas constituting the signal. In this context it will be remembered that the fluid received from source 22 is of a relatively high temperature and subject to substantial temperature fluctuations. Compensator 60 assures that the signal is not affected by changes in temperature of the gas flow to provide more stable circuit operation. Though not illustrated in detail the temperature compensator may comprise a fluidic amplifier device having a pair of input ports connected with a pair of output ports in negative feedback relationship. Flow restrictors associated with the input and output ports provide an input signal impedance and output signal impedance to the amplifier. The restrictors are of configuration and design such that the temperature characteristics of the input and output impedances are the same so that the output signal $\Delta P_d$ is temperature compensated.

The temperature compensated, combined single signal represented by pressure differential $\Delta P_d$ represents the input signal to a gain selector 62 that is described in greater detail below with respect to FIG. 3. Gain selector 62 allows the pilot to selectively modify the gain of $\Delta P_d$ relative to ambient temperature conditions. More particularly, selector 62 allows selection of a gain less than, equal to, or greater than one in relation to what are conventionally termed hot, normal and cold day ambient temperature conditions.

The output pressure differential signal $\Delta P_i$ is then combined by direct summing with a negative feedback signal $\Delta P_f$. $\Delta P_f$ is generated by a transducer such as an electrofluidic transducer 66 which is operably interconnected with lever 40 and the fuel control by appropriate connection illustrated by dashed line 70, and is effective to develop the fluid pressure differential feedback signal $\Delta P_f$ which is indicative of the actual position of levr 40 and thus the actual rate of fluid flow being fed to the engine 14. By the appropriate summing of the pressure differential signals $\Delta P_i$ and $\Delta P_f$ by interconnection of the respective conduits carrying these signals, there results an error pressure differential signal which is indicative of the adjustment required to drive lever 40 from its actual position to the desired position providing the desired fuel flow.

Transducer 66 may be of the type described in U.S. Pat. No. 3,638,671, having a pin operably connected to move with lever 40, the pin operable to variably deflect a fluid beam to produce a pressure differential output signal proportional to pin position and thus lever 40 position. As noted above, however, transducer 66 acts simply as a transducer, and any type of mechanical-to-fluidic transducer may be utilized in this feedback portion of the circuit.

As described in greater detail below with respect to FIGs. 4-7, the error signal which is the difference between the pressure differtials $\Delta P_i$ and $\Delta P_f$, constitutes the input signal to an amplifier system that includes power amplifier 48, a fluidic square-wave oscillator 64, and an attenuator 72 that modifies a square-wave output signal. $\Delta P_s$ of oscillator 64 into a substantially trapezoidal shaped, time varying, fluidic pressure differential signal $\Delta P_t$. As described in further detail below, the amplifier system is effective to generate a time oscillatory proportional or digital power output signal, represented by $\Delta P_o$, to drive the actuator 32 and adjust the fuel flow to the desired rate. Via the negative feedback signal $\Delta P_f$, a closed loop control circuit is provided around actuator 32 to assure proper adjustment of the fuel control in accordance with the desired rate of fuel flow as dictated by the equation set forth above.

Figure 2:
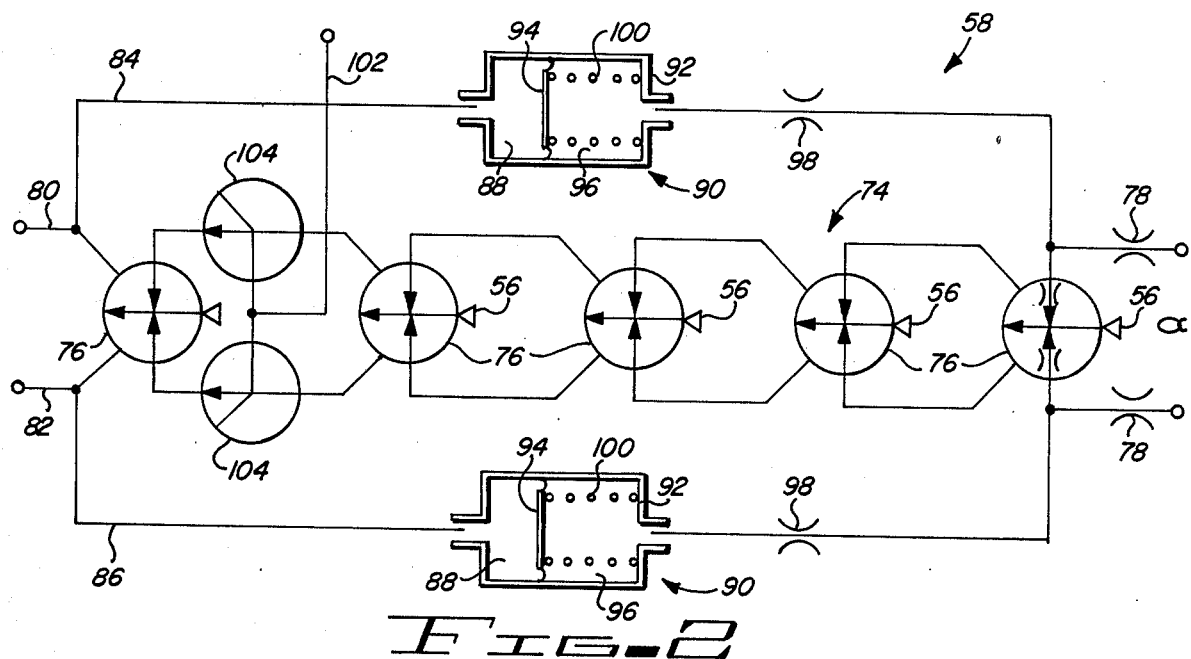
FIG. 2 is a schematic representation of the series capacitance fluidic integrator as contemplated by the present invention.

Referring now to FIG. 2, there is illustrated in greater detail the fluidic integrator 58 which includes a cascade 74 of proportional fluidic amplifiers 76 each having a pair of input ports and output ports, the amplifiers being cascaded with the output ports of one amplifier feeding the input ports of the next adjacent amplifier. Through appropriate fixed flow restrictors 78, the pressure differential signal $\alpha$ is impressed upon the input ports of the first amplifier 76 of the cascade. Across the output ports of the last amplifier 76 of the cascade is generated a fluid pressure differential output signal supplied to conduits 80 and 82 and associated feedback conduits 84 and 86.

The fluid pressures in the output ports are fed by ducts 84, 86 to variable volume output chambers 88 of substantially identical fluidic capacitors 90. Each capacitor comprises a casing 92 having an hollowed interior that is traversed by a bellows-type diaphragm piston 94 to divide the casing interior control variable volume output and input chambers 88 and 96, the latter respectively communicating via associated ducts and across fixed flow restrictors 98, with the input ports of cascade 74. A spring biasing member 100 in chamber 96 urges piston 94 in opposition to the urgings of fluid pressure from the associated feedback conduit 84, 86.

The integrator 58 further includes another fluid pressure supply conduit 102 leading from the stand-by control 178 to a pair of monostable fluidic gates 104 disposed in cascade 74 between a pair of adjacent amplifiers 76. Gates 104 are normally in positions allowing flow through the conduits associated therewith, but upon receiving fluid pressure from conduit 102, they shift to flow-prohibiting positions interrupting transmission of the signal through cascade 74.

In operation the input signal $\alpha$ is impressed upon the cascade through an input impedance created by restrictors 78. The signal is amplified by the cascade and through ducts 84, 86 is fed back in negative feedback relationship to drive diaphragm 94. Being biased by springs 100, however, the feedback signal transmitted from chambers 96 through the associated ducts is a function of the rate of change of pressure in the associated output port 80 or 82. Capacitors 90 also tend to reduce the magnitude of the feedback signal. Accordingly, the input signal received at the first amplifier in the cascade is the pressure differential $\alpha$, summed with a negative feedback signal that is a function of the rate of change of the pressure differential $\alpha$. As a result, the output signal across conduits 80, 82 represents the time integral of $\alpha$.

Preferably, the feedback impedance created by restrictors 98 is greater than the input impedance offered by restrictors 78, so that the integrator also provides gain to the output signal, i.e., the output signal is of greater magnitude than the input signal. The gain may be less than one, if desired. Such gain-plus-integration function simplifies the fluidic circuitry required in system 24. Restrictors 98 also add stability to integrator operation. Gates 104 allow setting of the initial conditions of integrator 58 by assuring that the integrator only begins operating whenever fluid pressure is relieved from conduit 102.

Figure 3:
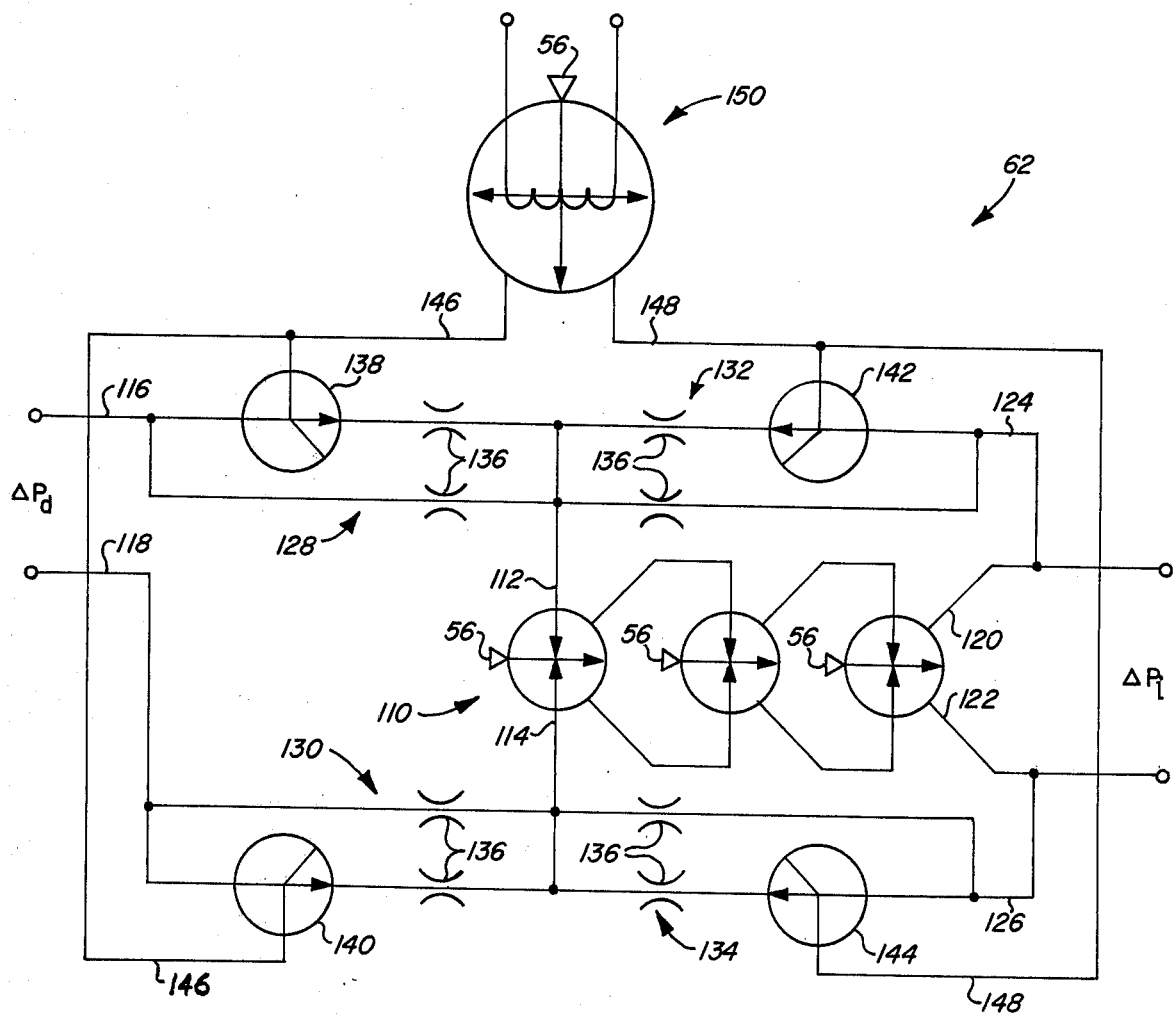
FIG. 3 is a schematic representation of the three-position fluidic gain selector.

FIG. 3 illustrates in detail the fluidic gain selector 62. Gain selector 62 incorporates a fluidic proportional amplifier 110 which may also be a cascade of proportional fluidic amplifiers similar to the cascade of amplifiers 76 in FIG. 2. Impressed across the input ports 112, 114 of the amplifier cascade 110 is the pressure differential input signal $\Delta P_d$ from input conduits 116, 118. The output ports 120, 122 from the amplifier cascade 110 which carries the output pressure differential $\Delta P_i$ is also interconnected in parallel relationship with the input conduits 116, 118 by feedback conduits 124, 126.

Associated with each of the input conduits 116, 118 and feedback conduits 126, 124 are respective resistive fluidic networks 128-134, each of which comprises at least a pair of fixed flow restrictors 136 in parallel relationship with one another. Disposed in series relationship with at least one of the flow restrictors 136 of each resistive network are associated mono-stable fluidic gates 138-144. The input pair of mono-stable gates 138-140 are energized by fluid pressure in a conduit 146, while the feedback gates 142-144 are energized by fluid pressure in conduit 148.

The gain selector further includes a switching mechanism 150 which is operable to selectively block fluid pressure flow through neither one, or either one of conduits 146, 148. While any type of appropriate mechanism may be utilized in order to produce such a three-stage pressure differential output across conduits 146, 148, one example of such device may be a tri-stable fluidic device schematically illustrated in FIG. 3 which constitutes the switching means 150. Such a single device is operable to transform a three-stage electrical input signal into the desired three-stage pressure differential output signal. A complete description of such a tristable fluidic device may be found in copending U.S. patent application Ser. No. 607,529 entitled "Tristable Fluidic Device", of Thomas B. Tippetts and Donald W. Chapin, filed concurrently herewith and having common assignee with the present invention. Such disclosure is incorporated herein by this reference to the extent necessary for a complete understanding of the present invention.

In operatin during "normal day" operations wherein the ambient conditions are in a preselected range, the switch and device 150 is selected to produce fluid pressure in both conduits 146 and 148. Accordingly, all mono-stable gates 138-144 are switched to positions interrupting flow through the associated fixed flow restrictors 136. In this condition the input impedance presented by the resistive networks 128, 134 equals the feedback impedance represented by the resistive networks 132, 134, and the gain of amplifier 110 is substantially equal to one, i.e., the magnitude of the pressure differential signal $\Delta P_d$ equals the magnitude of the pressure differential signal $\Delta P_i$.

For "hot day" operations when greater fuel flow is required for the same aircraft power, the switch and device 150 is disposed such that pressure fluid flow to conduit 146 is blocked while allowed through conduit 148. Accordingly, gates 142, 144 remain in positions prohibiting fluid flow to the associated fixed flow restrictors 136, while gates 138 and 140 shift to positions allowing flow to the associated restrictors. As a result the feedback impedance created by the resistive networks 132 and 134 is greater than the input impedance represented by resistive networks 128 and 130 such that the magnitude of the output signal $\Delta P_i$ is greater than that of the input signal $\Delta P_d$, and the gain is greater than one.

Similarly, upon switching switch 150 to its "cold day" position, pressure fluid flow to conduit 148 is blocked. As a result the input impedance of resistors 128, 130 is greater than the feedback impedance of resistive networks 132, 134, and the $\Delta P_i$ signal is of less magnitude than the $\Delta P_d$ signal so that the gain is less than one.

Figure 4:
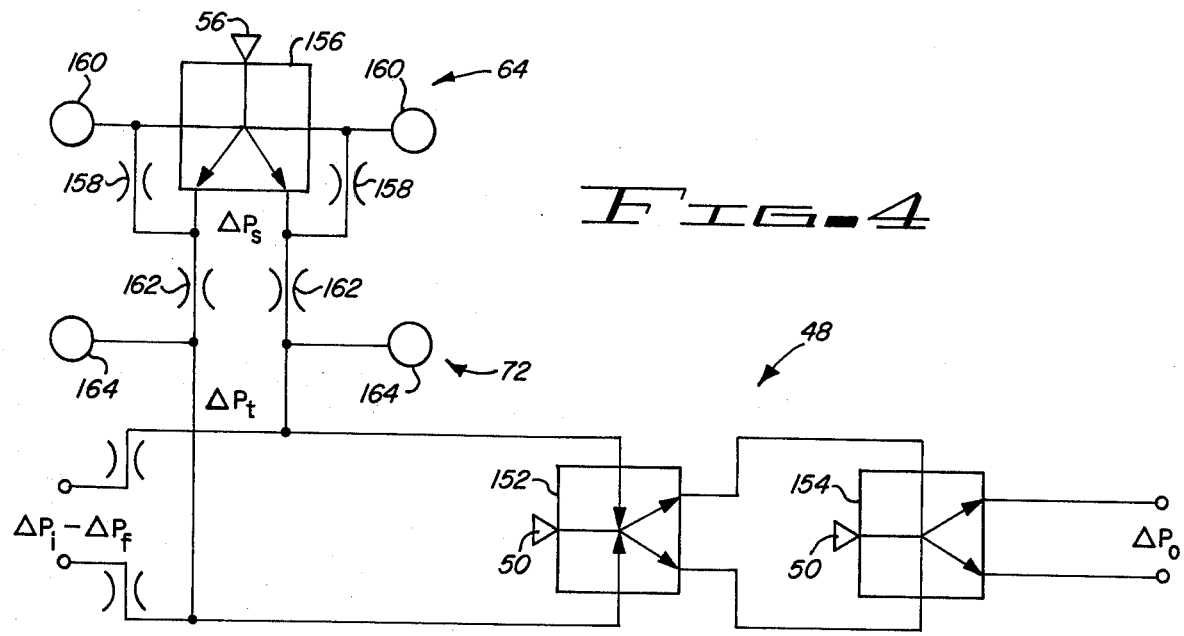
FIG. 4 is a schematic representation of the dual mode servo amplifier as contemplated by the present invention.

FIG. 4 illustrates in detail the amplifier system including power amplifier 48, oscillator 64, and attenuator 72. Power amplifier 48 is functionally illustrated and includes a digital amplifier 152 which may be a cascade of proportional amplifiers, and a last stage bistable fluidic amplifier 154 from which the output pressure differential signal $\Delta P_o$ is generated.

Oscillator 64 is functionally illustrated as a bistable fluidic amplifier 156 having feedback networks interconnecting the input ports and output ports of the amplifier 156 through a resistor 158 and accumulator 160 network. The output from oscillator 64 is a square wave, time varying oscillatory signal $\Delta P_s$ as clearly illustrated in FIG. 6a. Attenuator 72 includes a resistor 162 and an accumulator 164 communicating with each of the output conduits of oscillator 64. Attenuator 72 effectively attenuates the oscillations of the squarewave signal into a substantially trapezoidal shaped signal $\Delta P_t$ as illustrated in FIG. 6b.

The input error signal $(\Delta P_i - \Delta P_f)$ is combined with the attenuated trapezoidal signal $\Delta P_t$ so that the result of addition of these two signals, as illustrated in FIG. 6c, has the effect of biasing or shifting the trapezoidal upwardly or downwardly. In this context it will be seen that the combined signal of $\Delta P_t$ and the error signal is fed as the input signal into the power digital amplifier 152. The digital amplifier switches in accordance with the input signal thereto so that its output pressure differential power signal $\Delta P_o$ is a square wave, time oscillatory signal whose width is modulated in relation to the magnitude of the error signal, as clearly illustrated in FIG. 6d.

As long as the magnitude of the error signal $(\Delta P_i - \Delta P_f)$ is of less magnitude than the amplitude of the trapezoidal signal $\Delta P_t$, the resulting output signal $\Delta P_o$ is of the form illustrated in FIG. 6d with a square wave signal of modulated width. Depending upon the magnitude of the error signal $(\Delta P_i - \Delta P_f)$, the time average of the output signal $(\Delta P_o AVG)$ will be proportional to the magnitude of the error signal.

However, when the magnitude of the error signal is greater than the amplitude of the trapezoidal signal $\Delta P_t$, the trapezoidal signal is shifted a sufficient distance so as never to cross the horizontal axis of the time dependent graph illustrated in FIG. 6c. As a result, the combined input signal to the power amplifier 48 is as illustrated in FIG. 6e. The power amplifier will never switch in this condition, and the differential pressure output signal $\Delta P_o$ will be a continuous digital signal or, in other terms, a square wave signal of very long, substantially infinite width as illustrated in FIG. 6f. It will be apparent that the time average of $\Delta P_o$ in this digital mode of operation will be equal to the magnitude of the pressure differential signal $\Delta P_o$.

Figure 7:
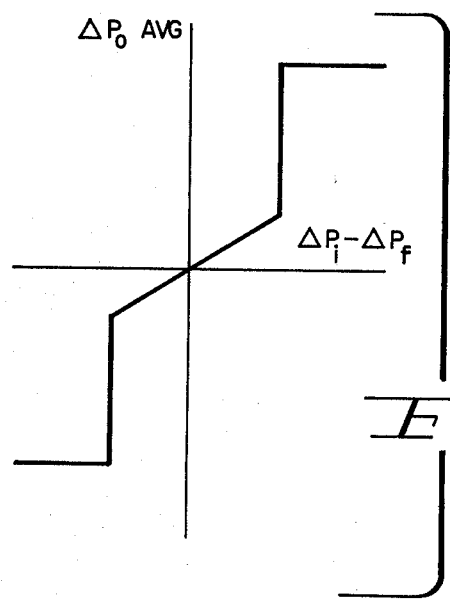
FIG. 7 is a graphical representation of the combined proportional and digital power output signal which drives the fuel control actuator, as plotted against the fuel error signal.

Accordingly, the present invention provides a dual mode servo system, wherein the time average of the pressure differential output signal $(\Delta P_o AVG)$ is proportional to the error signal impressed thereupon $(\Delta P_i - \Delta P_f)$, as long as this error signal is below a preselected magnitude, as shown by the ramp portion of the graphical representation in FIG. 7. Whenever the error signal exceeds this preselected magnitude, however, the proportional mode is replaced by the digital mode wherein the time average value $(\Delta P_o AVG)$ is a predetermined, constant value the maximum which can be developed by power amplifier 48, the magnitude of the time average of the output signal in the digital mode thereby being independent of the magnitude of the error signal $(\Delta P_i - \Delta P_f)$. Preferably, as shown by the discontinuities in the FIG. 7 curve, the maximum value of $(\Delta P_o AVG)$ in the proportional mode is substantially less than the magnitude of $(\Delta P_o AVG)$ in the digital mode.

Figure 5:
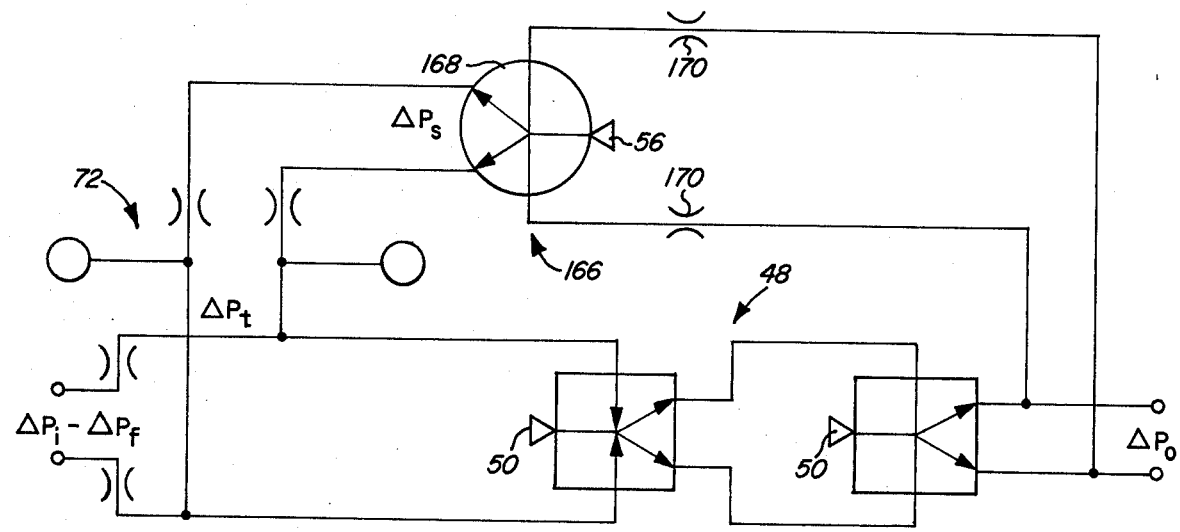
FIG. 5 is a schematic representation of a modified form of fluidic dual mode servo actuator.

FIG. 5 illustrates a slightly modified form of power amplifier system which incorporates the same power amplifier 48 and attenuator system 72 as discussed above with respect to FIG. 4. Instead of the feedback-driven oscillator 64 of FIG. 4, however, this embodiment utilizes an oscillator 166 which includes a bistable amplifier 168 generating the square wave output signal $\Delta P_s$. The input ports from the oscillator 168 are connected in negative feedback relationship with the output ports of power amplifier 48 such that the time varying square wave pressure differential output signal $\Delta P_o$ is fed back through appropriate restrictors 170 to drive amplifier 168 and create the square wave signal $\Delta P_s$. Because of the width modulation of the square wave output $\Delta P_o$, the square wave signal $\Delta P_s$ from amplifier 168 will have a frequency that is variable with the magnitude of the error signal. At large error signals wherein the system operates in the digital mode, the frequency will approach zero. As the error signal becomes smaller, the frequency will increase to afford more precise control. Use of the feedback arrangement of FIG. 5 also simplifies the fluidic circuit since fewer amplifier stages are required in amplifier 168 than in amplifier 156 of FIG. 4 to produce the necessary gain and magnitude of the $\Delta p_g$ signal. Otherwise, the arrangement illustrated in FIG. 5 operates substantially as described above with respect to FIG. 4.

In operation of the overall system, upon initiation of the landing approach operation of the aircraft, the on-off override controls 176 are appropriately engaged. Placed first in stand-by condition for warm-up, valve 182 is positioned to prevent system operation and to supply pressure to the monostable gates 104 of the integrator 58 to prevent integrator wind-up and undesired operation. After warm-up controls 178 are set to close valve 182 and relieve pressure from conduit 102 to allow initiation of operation of system 24.

The sensed parameters $\alpha$, $\eta$, and $\delta$ are transformed into appropriate fluidic pressure differential signals as input signals to the fluidic control system. The angle of attack signal is integrated by action of integrator 58 in the manner described above, and then this integrated signal along with the other signals are algebraically summed after appropriate relative modification of the magnitude of the signals, to produce a single signal representative of the desired rate of fuel flow in accordance with the preselected schedule and thus in accordance with the formula as set forth previously. The single signal is temperature compensated by compensator 60 and fed as an input signal $\Delta P_d$ to gain selector 62. By appropriate positioning of the switch means 150, the gain of amplifier 110 is appropriately selected relative to the existing ambient environment conditions so that the signal $\Delta P_i$ is modified in magnitude relative to these ambient conditions.

The actual rate of fuel flow being delivered to the engine is sensed through the angular position of lever 40 and transformed to a corresponding fluidic pressure differential signal $\Delta P_f$ through electrofluific transducer 66. The difference between signals $\Delta P_i$ and $\Delta P_f$ represents an error signal whose magnitude is proportional to the required change in fuel flow and thus the required amount of rotation of lever 40. As discussed above with respect to FIGS. 4-7, this error signal is impressed upon a substantially trapezoidal, time varying signal $\Delta P_t$ to bias the latter and thereupon drive a power amplifier 48. Depending upon the magnitude of the error signal, the output signal $\Delta P_o$ is either a digital signal of non-varying magnitude, or a signal proportional to the magnitude of the error signal. When the error is greater than the preselected magnitude, the output signal $\Delta P_o$ is in a digital mode, causing actuator 32 to be driven more rapidly, and when the error signal is below the preselected magnitude, the average of the output signal $\Delta P_o$ is proportional to the magnitude of the error signal. The actuator 32 is driven by the time average of the power output signal $\Delta P_o$ until the actual rate of fuel flow equals the desired rate of fuel flow. In this latter condition the magnitude of the signals $\Delta P_i$ and $\Delta P_f$ will be substantially equal yet of different relative sign so that the trapezoidal signal $P_f$ is not biased upwardly or downwardly. Accordingly the areas 172 and 174 within the curve defined by the trapezoidal signal $\Delta P_t$ are substantially equal, the switching of power amplifier 48 will occur at equal time intervals, the time average of $\Delta P_o$ will be zero, and the actuator 32 will be at rest.

From the foregoing it will be apparent that the present invention contemplates a method of fluidically controlling rate of fuel flow to the aircraft engine to automatically control its power through a preselected schedule, which includes the steps of sensing desired flight parameters and generating fluidic parameters in relation thereto. These several signals are then appropriately combined (including integration of one of the signals) into a single signal indicative of the desired rate of fuel flow. After temperature compensating the signal, its gain is selectively fluidically altered in relation to the ambient environmental conditions being encountered by the aircraft. A fluidic negative feedback signal is generated in relation to the actual rate of fuel flow, and comparison of this to the singal input signal generates an error signal which is fed to a power amplifier. The actual rate of fuel flow is then adjusted by the amplifier fluidic error signal so that the engine develops power in accordance with the preselected schedule.

The invention further contemplates improved methods for generating a dual mode output signal and driving an actuator therewith, for selectively changing the gain of an amplifier, and for integrating a a fluidic signal, all as described in detail above with respect to FIGS. 2-7.

While preferred forms of the invention have been set forth in detail above in order to enable one of ordinary skill in the art to practice and use it, the detailed description should be considered exemplary in nature and not as limiting to the scope and spirit of the invention as set forth in the appended claims.

Having thus described the invention with sufficient clarity that those skilled in the art may make and us it, I claim:

1. A method of fluidically controlling rate of fuel flow to the engine of an aircraft during landing approach operation thereof whereby the power generated by the engine is automatically controlled through a preselected schedule during landing approach, comprising the steps of:

sensing a plurality of aircraft flight parameters including angle of attack of the aircraft, aircraft acceleration normal to the direction of aircraft flight, and position of the elevator of the aircraft;

generating fluidic parameter signals in relation to said sensed parameters;

fluidically combining said fluid parameter signals in a preselected manner into a single fluid signal indicative of a desired rate of fuel flow to the aircraft engine for developing power in accordance with said preselected schedule;

generating a fluidic feedback signal in relation to the actual rate of fuel flow being delivered to said engine;

fluidically comparing said signal fluid signal and said fluidic feedback signal and producing a fluidic error signal indicative of the difference said actual rate of fuel flow and said desired rate of fuel flow; and adjusting said actual rate of fuel flow in relation to said fluidic error signal whereby said engine develops power in accordance with said preselected schedule.

2. A method as set forth in claim 1, further including the step of fluidically modifying said single fluid signal relative to the temperture of the fluid constituting said single fluid signal whereby said single fluidic signal is independent of variations in said temperature of the fluid.

3. A method as set forth in claim 1, further including the step of selectively fluidically altering the magnitude of said signal fluidic signal in relation to ambient environmental conditions prior to said comparing step.

4. A method as set forth in claim 3, wherein said selective magnitude altering step includes selectively changing the magnitude of said single fluidic signal in discrete steps relative to ambient environmental conditions.

5. A method as set forth in claim 1, wherein said combining step includes fluidically modifying the magnitude of said fluidic parameter signals relative to one another, and summing said modified fluidic parameter signals into said single fluidic signal indicative of said desired rate of fuel flow.

6. A method as set forth in claim 5, wherein said combining step further includes fluidically integrating the angle of attack fluidic parameter signal prior to said summing.

7. A method as set forth in claim 1, further including the step of amplifying said fluidic error signal into a pressure differential power signal, said adjusting step including driving a mechanical actuator with said pressure differential power signal to adjust said actual rate of fuel flow.

8. A method as set forth in claim 7, wherein said amplifying step includes generating a pressure differential power signal of magnitude proportional to said fluidic error signal whenever said difference between the actual rate and desired rate of fuel flow is less than a predetermined value, and generating a digital pressure differential power signal of predetermined magnitude independent of the magnitude of said fluidic error signal whenever said difference between the actual and desired rates of fuel flow is greater than said preselected value.

9. A method as set forth in claim 7, wherein said amplifying step includes fluidically generating a square wave power output pressure differential signal whose width is fluidically modulated in relation to said fluid error signal, and said adjusting step including driving said actuator in relation to the timing average of said width modulated square wave power output signal.

10. A method as set forth in claim 9, wherein said amplifying step further includes fluidically generating a square wave pressure differential signal, fluidically attenuating said square wave signal to produce a trapezoidal signal, impressing said fluidic error signal upon said trapezoidal signal to bias said trapezoidal signal, and driving a fluidic digital amplifier with said biased trapezoidal signal to produce said width modulated square wave power output signal.

11. A method as set forth in claim 10, wherein said time average of said modulated square wave power output signal is a signal proportional to said fluidic error signal whenever the difference between said actual rate and desired rate of fuel flow is less than a preselected value, and said time average is a digital signal of magnitude independent of the magnitude of said fluidic error signal whenever said difference between the actual and desired rates of fuel flow is greater than said preselected value.

12. Apparatus for fluidically controlling adjustable fuel delivery means which supply fuel flow to the engine of an aircraft during landing approach operation thereof whereby the power generated by the engine is automatically controlled through a preselected schedule during landing approach, comprising:
sensing means for sensing a plurality of aircraft flight parameters including angle of attack of the aircraft, aircraft acceleration normal to the direction of flight thereof, and position of the elevator of the aircraft;
generating means operably coupled with said sensing means for generating fluidic parameter signals in relation to said sensed parameters;
combining means operably coupled with said generating means for fluidically combining said fluidic parameter signals in a preselected manner into a single fluidic signal indicative of a desired rate of fuel flow to the engine for developing power in accordance with said preselected schedule;
feedback means operably coupled with said fuel deliverly means for generating a fluidic feedback signal in relation to the actual rate of fuel being delivered to said engine;
comparing means operably coupled with said feedback means and said combining means for fluidically comparing said single fluidic signal and said fluidic signal, and for producing a fluidic error signal indicative of the difference between said actual rate of fuel flow and said desired rate of fuel flow; and
actuator means operably coupled with said comparing means and said fuel deliverly means for adjusting said fuel delivery means to alter said actual rate of fuel flow in relation to said fluidic error signal whereby said engine develops power in accordance with said preselected schedule.

13. Apparatus as set forth in claim 12, further including stand-by control means for selectively disabling said actuator means to prevent adjustment of said fuel delivery means.

14. Apparatus as set forth in claim 13, wherein said combining means includes a fluidic integrator for integrating the angle of attack fluidic signal.

15. Apparauts as set forth in claim 14, wherein said integrator includes fluidic amplifier means and shiftable fluidic monostable gates operably coupled with said amplifier means and said stand-by control means, whereby upon disablement of said actuator means said gates are shifted to positions disabling said integrator.

16. Apparatus as set forth in claim 15, wherein said integrator comprises:
a cascade of fluidic amplifiers, said cascade having first and second input ports operably coupled with said generating means whereby said angle of attack fluidic signal is impressed thereacross, said cascade having first and second output ports communicating with said combining means;
first and second fluidic capacitors each comprising a hollowed casing and movable diaphragm therein dividing the interior of the casing into input and output variable volume chambers;
first and second ducts respectively connecting said first and second output ports with said output chambers of the first and second capacitors;
third and fourth ducts respectively connecting said first and second input ports with said input chambers of the first and second capacitors; and biasing means in said input chambers of the first and second capacitors for opposing movement of the associated diaphragm under the urgings of fluid pressure in said output chambers, whereby said third and fourth ducts deliver a pressure differential signal to said input ports in relation to the rate of change of pressure in said output ports such that the pressure differential signal generated across said output ports is a time integration function of said angle of attack fluidic signal.

17. Apparatus as set forth in claim 12, further including:
square wave means for generating a fluidic, time varying, square wave pressure differential signal;
attenuating means operably coupled to said square wave means for attenuating said square wave signal into a time varying, substantially trapezoidal signal, said comparing means being operably coupled with said attenuating means whereby said error signal biases said trapezoidal signal; and
fluidic power amplifier means driven by said biased trapezoidal signal to produce a dual mode square wave power output signal from said power amplifier means whose width is modulated relative to said error signal, whereby said power output signal has a time average value proportional to said error signal whenever said error signal is less than a preselected magnitude, and has a predetermined substantially constant time average value independent of the magnitude of said error signal whenever said error signal is greater than said preselected magnitude, said power amplifier means operably coupled with said actuator means such that said fuel delivery means is adjusted in relation to said time average values of said power output signal.

18. Apparatus as set forth in claim 12, further including gain selector means interposed between said combining means and said comparing means and comprising:
fluidic amplifier means having a pair of input ports and an associated pair of input conduits communicating with said combining means whereby said single fluidic signal is impressed across said pair of input ports, and a pair of output ports communicating with said comparing means;
a pair of feedback conduits interconnecting said output ports with said input ports in parallel relationship with said input conduits;
a fluidic resistive network in each of said feedback and said input conduits; and
means operably coupled with said resistive networks for selectively changing the impedances of said resistive networks to change the gain of said amplifier means.

19. A method of fluidically generating a dual mode fluidic output signal in relation to a fluidic input signal, comprising the steps of:
fluidically generating a substantially square wave pressure differential signal;
fluidically attenuating said square wave signal to produce a trapezoidal signal;
impressing said input signal upon said trapezoidal signal to bias said trapezoidal signal; and
driving a fluidic digital amplifier with said biased trapezoidal signal to produce a dual mode square wave output signal whose width is modulated relative to said input signal, said dual mode output signal having a proportional time average value proportional to the magnitude of said input signal whenever said input signal is less than a preselected magnitude, and having a predetermined digital time average value independent of the said magnitude of said input signal whenever said input signal is greater than said preselected magnitude.

20. A method as set forth in claim 19, wherein said predetermined digital time average value is substantially constant.

21. A method as set forth in claim 20, wherein said substantially constant predetermined time average value is substantially greater than the maximum value of said proportional time average value.

22. A method of driving a fluid pressure responsive member from its actual position to a desired position, comprising the steps of:
producing a fluidic input signal and a fluidic feedback signal respectively indicative of said desired and actual positions;
comparing said input and feedback signals and producing an error signal therefrom whose magnitude is indicative of the difference between said actual and desired positions;
fluidically generating a substantially square wave pressure differential signal;
fluidically attenuating said square wave signal to produce a trapezoidal signal;
impressing said error signal upon said trapezoidal signal to bias said trapezoidal signal;
driving a fluidic digital amplifier with said biased trapezoidal signal to produce an oscillatory dual mode square wave output signal whose time average value is proportional to the magnitude of said error signal whenever said error signal is less than a preselected magnitude, and whose time average value is of a predetermined magnitude independent of the magnitude of said error signal whenever said error signal is greater than said preselected magnitude; and
driving said member from its actual position towards its desired position in relation to said time average value of the dual mode output signal, whereby said member is respectively driven by proportional and by digital pressure differential signals whenever said difference between the actual and desired positions is less than and greater than a preselected amount.

23. A method as set forth in claim 22, wherein said comparing step includes summing said input signal and said feedback signal to produce said error signal.

24. A method as set forth in claim 22, wherein said attenuating step includes providing fluid resistors and fluid accumulators communicating with said square wave pressure differential signal.

25. Apparatus for driving a fluid responsive member from its actual position toward a desired position, comprising:
signal means for producing a fluidic pressure differential error signal whose magnitude is indicative of the difference between the actual position and the desired position of said members;
square wave means for generating a fluidic, time varying, square wave differential pressure signal;
attenuating means operably coupled to said square wave means for attenuating said square wave signal into a time varying, substantially trapezoidal signal, said signal means being operably coupled with said attenuating means whereby said error signal biases said trapezoidal signal;

fluidic power amplifier means driven by said biased trapezoidal signal to produce a dual mode square wave power output signal from said amplifier means whose width is modulated relative to said error signal, whereby said dual mode power output signal has a time average value proportional to said error signal whenever the latter is less than a preselected magnitude, and has a predetermined time average value independent of the magnitude of said error signal whenever the latter is greater than said preselected magnitude; and connecting means operably connecting said power amplifier means with said member whereby said member is driven from its actual position toward said desired position by said dual mode power output signal in relation to said time average value of said dual mode power output signal.

26. Apparatus as set forth in claim 25, wherein said square wave means includes a source of pressurized fluid and a fluidic oscillator operably coupled with said source to be supplied with pressurized fluid therefrom.

27. Apparatus as set forth in claim 26, wherein said fluidic oscillator includes a bi-stable fluidic amplifier having a supply port operably connected with said source, a pair of output ports and a pair of inputs ports, said input ports being operably coupled with said output ports whereby said bi-stable amplifier generates said time varying, square wave pressure differential signal across said pair of output ports.

28. Apparatus as set forth in claim 26, wherein said fluidic oscillator is operable to generate a time varying square wave pressure differential signal having a frequency that varies with respect to the magnitude of said error signal.

29. Apparatus as set forth in claim 28, wherein said oscillator comprises a bi-stable fluidic amplifier having a supply port communicating with said source, a pair of output ports, and a pair of input ports operably coupled with said connecting means whereby said time varying, square wave pressure differential signal is generated across said output ports of the bi-stable amplifier with a frequency that varies in relation to the magnitude of said error signal.

30. Apparatus as set forth in claim 25, wherein said attenuating means includes a fluidic attenuator comprising fluid flow restrictor means and fluid accumulator means operably coupled with said square wave means to attenuate said square wave signal to said time varying trapezoidal signal.

31. Apparatus as set forth in claim 25, wherein said signal means includes input means for producing a fluidic input signal indicative of said desired position, and feedback means operably coupled with said member for producing fluidic feedback signal indicative of said actual position, said input means and feedback means being operably interconnected to produce said fluidic error signal.

32. Apparatus as set forth in claim 25, wherein said fluid responsive member includes a double acting piston traversing a fluid receiving cavity to divide said cavity into a pair of opposing fluid chambers, said connecting means comprising a pair of conduits operably connected with said chambers to impress said dual mode power output signal upon said piston, whereby said piston is movable in said cavity in relation to said time average value of the dual mode power output signal.

33. A method of selectively changing the gain of fluidic amplifier means having a pair of input signal ports, comprising the steps of:

impressing a fluidic pressure differential input signal across said pair of input signal ports;

providing a plurality of resistive networks associated with said input ports; and selectively varying the impedance of said resistive networks to selectively change the gain of said fluidic amplifier means, said resistive networks each comprising a plurality of fixed flow restrictors arranged in parallel relationship, said varying step including selectively switching fluidic monostable gates respectively located in series relationship with at least one said restrictors in each of said resistive networks.

34. A method of selectively changing the gain of fluidic amplifier means having a pair of input signal ports and a pair of output signal ports, comprising the steps of:

impressing a fluidic pressure differential input signal across said input ports through a first pair of resistive networks;

communicating said output ports with said input ports through a corresponding second pair of resistive networks in parallel relationship with said input signal; and selectively varying the impedances of said first and second pairs of resistive networks to selectively change the gain of said fluidic amplifier means.

35. A method as set forth in claim 34, wherein said varying step includes selectively switching fluidic monostable gates respectively located in series relationship with each of said resistive networks.

36. Apparatus for selectively changing the gain of a fluidic amplifier means having a supply part adapted to be connected to a source of fluid pressure, a pair of input signal ports, and a pair of output signal ports, comprising:

input signal means including a pair of input conduits communicating with said input signal ports for impressing a fluidic pressure differential input signal upon said input ports;

a pair of feedback conduits interconnecting said output signal ports with said input signal ports in parallel relationship with said pair of input conduits;

a fluidic resistive network in each of said feedback conduits and in each of said input conduits; and impedance changing means operably coupled with both said pair of input conduits and said pair of feedback conduits for selectively changing the impedances of the resistive networks associated with said input conduits and said feedback conduits to accordingly change the gain of said amplifier means.

37. Apparatus as set forth in claim 36, wherein each of said fluidic resistive networks comprises a plurality of fixed flow restrictors arranged in parallel relationship, said impedance changing means being operable to selectively block fluid flow through at least one of said fixed flow restrictors associated with each of said resistive networks.

38. Apparatus as set forth in claim 37, wherein said impedance changing means includes a fluidic monostable gate disposed in series relationship with at least one of said fixed restrictors of each of said resistive networks, and switch means for selectively fluidically switching said monostable gates between positions permitting and prohibiting fluid flow through said fixed resistor disposed in series therewith.

39. Apparatus as set forth in claim 38, wherein said switch means includes a fluidic switch operable to selectively switch said gates between said flow permitting and flow prohibiting positions.

40. Apparatus as set forth in claim 39, wherein said fluidic switch includes a tri-stable fluidic device having associated first and second output ports, said tri-stable device operable to selectively provide substantially equal pressure in said first and second output ports, to provide high pressure in said first output port, and to provide higher pressure in said second output port, said first output port communicating with said monostable gates associated with the resistive networks is said input conduits, and said second output port communicating with said monostable gates associated with the resistive networks in said feedback conduits.

41. A fluidic integrator comprising:
a plurality of fluidic amplifiers operably interconnected to present a cascade of amplifiers having first and second input ports, and first and second output ports;
input signal means for impressing a fluidic pressure differential input signal upon said first and second input ports;
first and second fluidic capacitors each comprising a hollowed casing and a movable diaphragm dividing the interior of said casing into input and output variable volume chambers;
first and second ducts respectively communicating said first and second output ports with said output chambers of the first and second capacitors, whereby fluid pressure in said first and second output ports respectively drive said diaphragms of the first and second capacitors;
third and fourth ducts respectively interconnecting said input chambers of said first and second capacitors with said first and second input ports in parallel relationship with said input signal means; and
biasing means in said input chambers of the first and second capacitors for producing a force opposing said fluid pressure in said first and second output ports, whereby said diaphragms move and said third and fourth ducts deliver a negative feedback pressure differential signal to said input ports in relation to the rate of change of pressure in the output ports such that the pressure differential signal generated across said output ports is a time integration function of said input signal.

42. An integrator as set forth in claim 41, further including fixed flow restrictors in said third and forth ducts presenting an impedance to said feedback signal greater than impedance encountered by said input signal whereby said signal generated across said output ports has a magnitude proportional to and greater than the magnitude of said input signal.

43. A fluidic integrator comprising:
a plurality of fluidic amplifiers operably interconnected to present a cascade of amplifiers having first and second input ports, and first and second output ports;
input signal means for impressing a fluidic pressure differential input signal upon said first and second input ports;
first and second fluidic capacitors each comprising a hollowed casing and a movable diaphragm dividing the interior of said casing into input and output variable volume chambers;
first and second ducts respectively communicating said first and second output ports with said output chambers of the first and second capacitors, whereby fluid pressure in said first and second output ports respectively drive said diaphragms of the first and second capacitors;
third and fourth ducts respectively interconnecting said input chambers of said first and second capacitors with said first and second input ports in parallel relationship with said input signal means;
biasing means in said input chambers of the first and second capacitors for producing a force opposing said fluid pressure in said first and second output ports, whereby said diaphragms move and said third and fourth ducts deliver a feedback pressure differential signal to said input ports in relation to the rate of change of pressure in the output ports such that the pressure differential signal generated across said output ports is a time integration function of said input signal; and
a pair of monostable gates interposed between an adjacent pair of said amplifiers in said cascade, said gates being selectively fluidically actuated to interrupt fluid flow through said cascade.

44. A method of integrating a fluidic pressure differential signal, comprising the steps of:
impressing a flluid pressure differential signal upon first and second input ports of a cascade of fluidic amplifiers, said cascade having first and second output ports;
providing first and second negative feedback loops respectively between said first input and output ports and said second input and output ports;
interposing respective first and second fluidic capacitors in said first and second feedback loops whereby associated input and output variable volume chambers formed by a movable diaphragm therebetween in each of said capacitors respectively communicate with said input ports and output ports of said cascade;
driving said diaphragms by fluid pressure in the associated output port to displace fluid from the associated input chamber; and
biasing said diaphragms against movement in response to said pressure in the output ports to effect delivery of a pressure signal to said input ports in relation to rate of change of pressure in said output ports such that the fluid pressure differential developed across said output ports is a time integral function of said input signal.

* * * * *

UNITED STATES PATENT AND TRADEMARK OFFICE
CERTIFICATE OF CORRECTION

PATENT NO. : 4,019,697
DATED : April 26, 1977
INVENTOR(S) : Thomas B. Tippetts

It is certified that error appears in the above-identified patent and that said Letters Patent are hereby corrected as shown below:

Col. 1, lines 39 and 42, read "attach" as --attack--.

Col. 3, line 47, read "contrl" as --control--; at the beginning of line 64, add the phrase --attack of--; line 67, read "attach" as --attack--.

Col. 5, line 11, read "levr" as --lever--; line 34, delete the period after "signal".

Col. 7, line 15, read "operatin" as --operation--.

Col. 10, line 62, after "difference" insert --between--.

Col. 12, line 28, before "fluidic" (first occurrence), insert --feedback--.

Col. 17, line 17, read "is" as --in--;
line 56, read "forth" as --fourth--.

Col. 18, line 38, read "flluid" as --fluid--.

Signed and Sealed this

Eighteenth Day of April 1978

[SEAL]

Attest:

RUTH C. MASON
Attesting Officer

LUTRELLE F. PARKER
Acting Commissioner of Patents and Trademarks